UNITED STATES PATENT OFFICE.

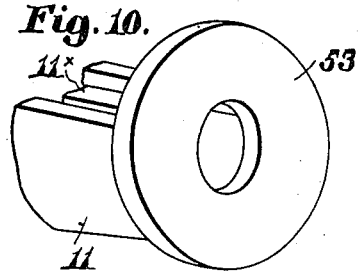
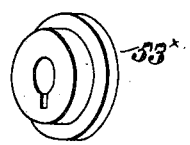
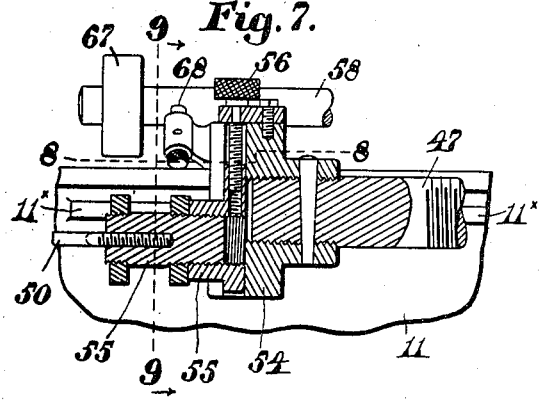
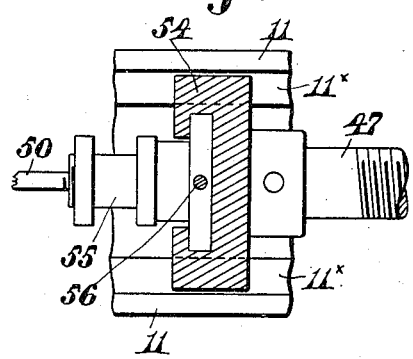
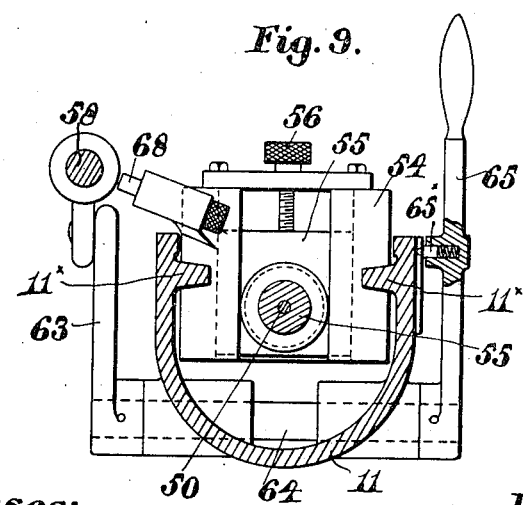

FRANCIS J. LAPOINTE, OF HUDSON, MASSACHUSETTS.

KEY-SEAT-BROACHING MACHINE.

1,137,218.  Specification of Letters Patent.  Patented Apr. 27, 1915.

Application filed July 26, 1911. Serial No. 640,960.

*To all whom it may concern:*

Be it known that I, FRANCIS J. LAPOINTE, a citizen of the United States of America, and a resident of Hudson, in the county of Middlesex and State of Massachusetts, have invented certain new and useful Improvements in Key-Seat-Broaching Machines, of which the following is a specification.

This invention relates to key seat broaching machines, and has for its object the production of a machine in which key seats may be cut in pulleys, gears, and similar articles having bores of different diameters without requiring any complicated adjustments or change in the mechanism to adapt the same for different sizes of bores in the articles to be operated upon. It provides for a suitable mechanism for operating the working tool, insuring its steady movement during its operation, thereby accomplishing better results than in machines now in general use.

The invention further consists in certain novel features of construction and arrangement of parts which will be thoroughly understood by reference to the description of the drawings and to the claims hereinafter given.

Figure 1:
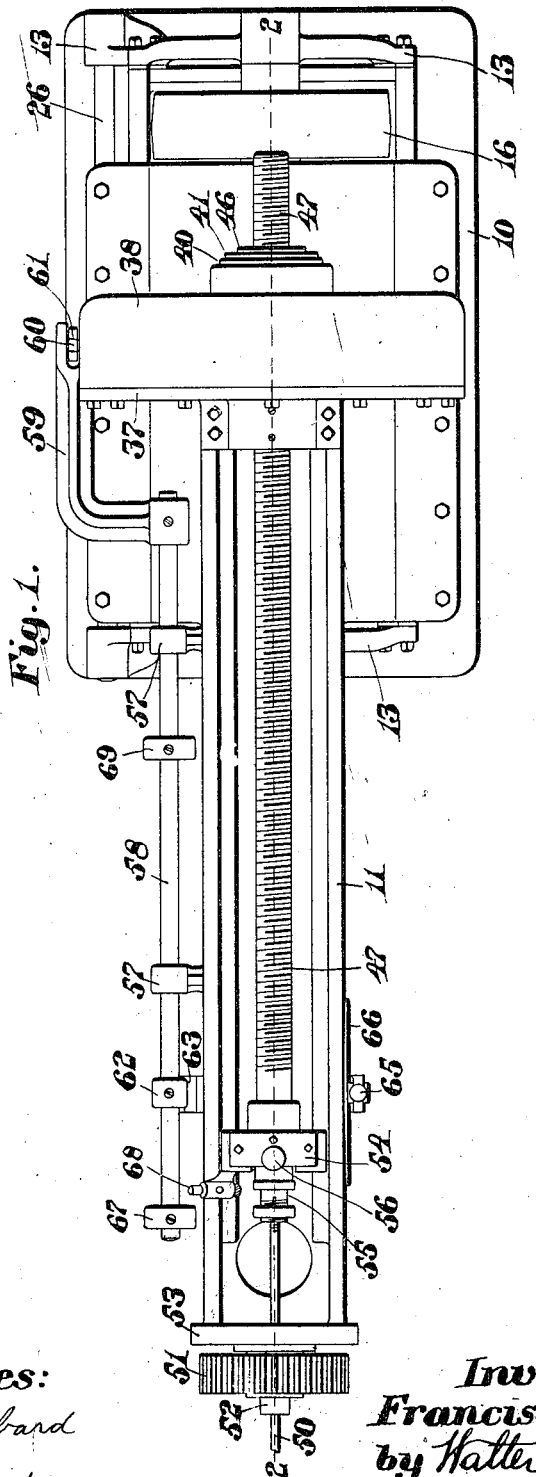
Figure 2:
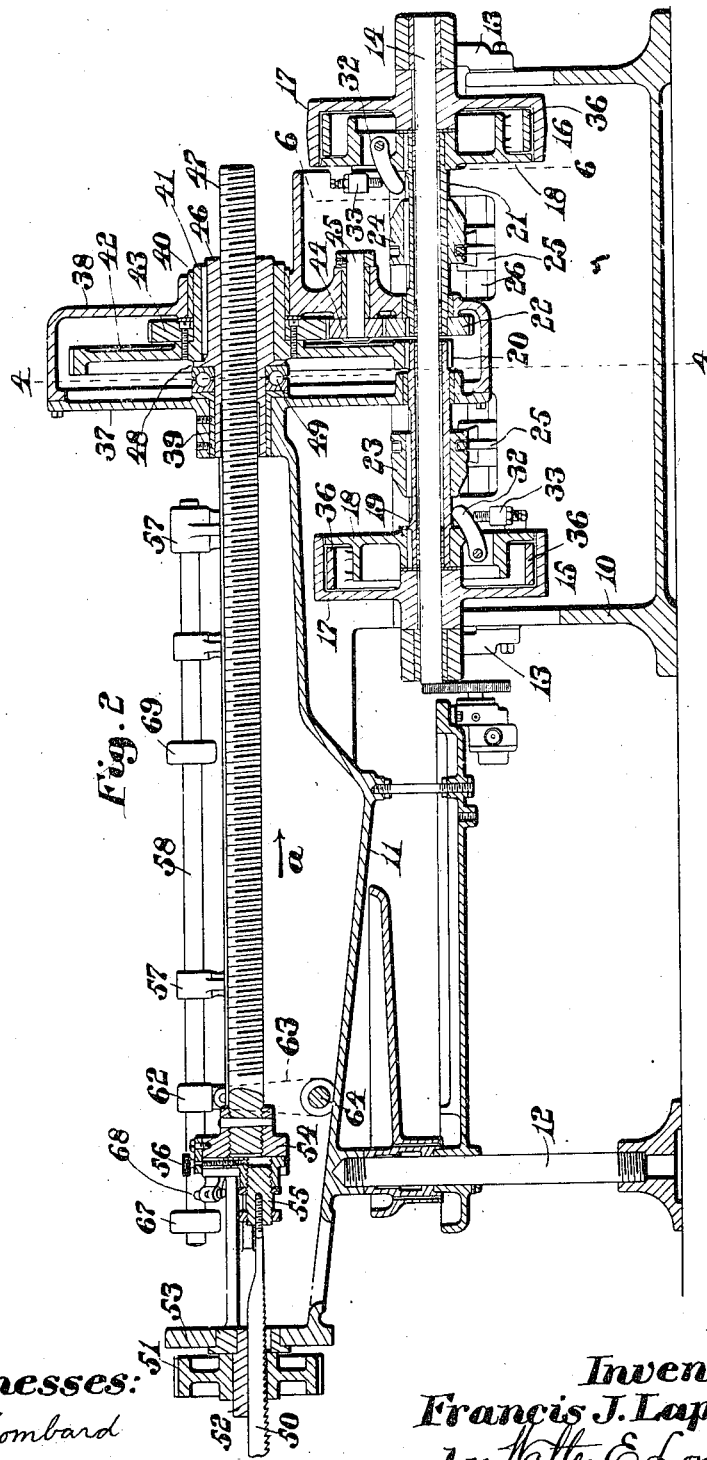
Figure 3:
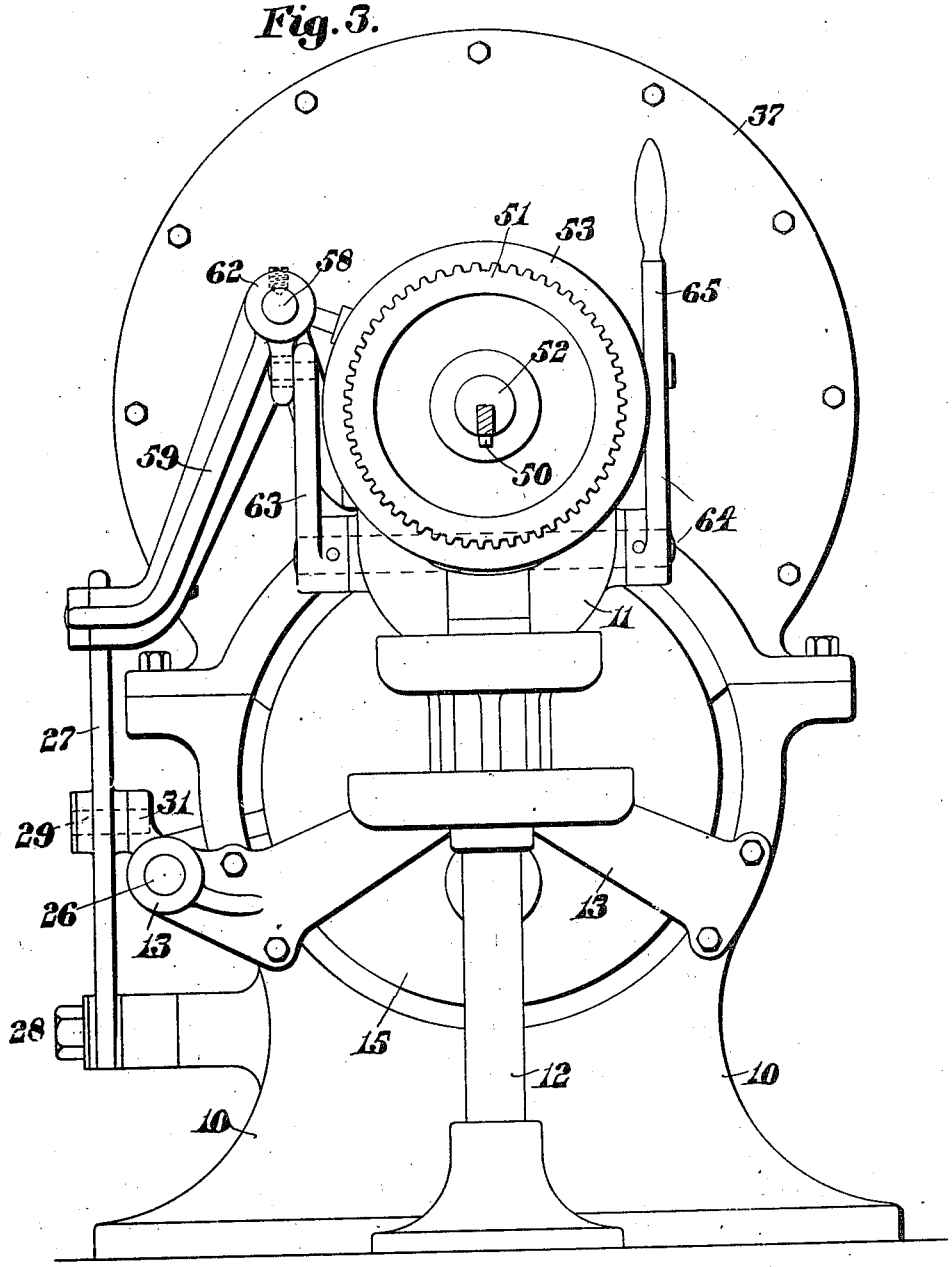
Figure 4:
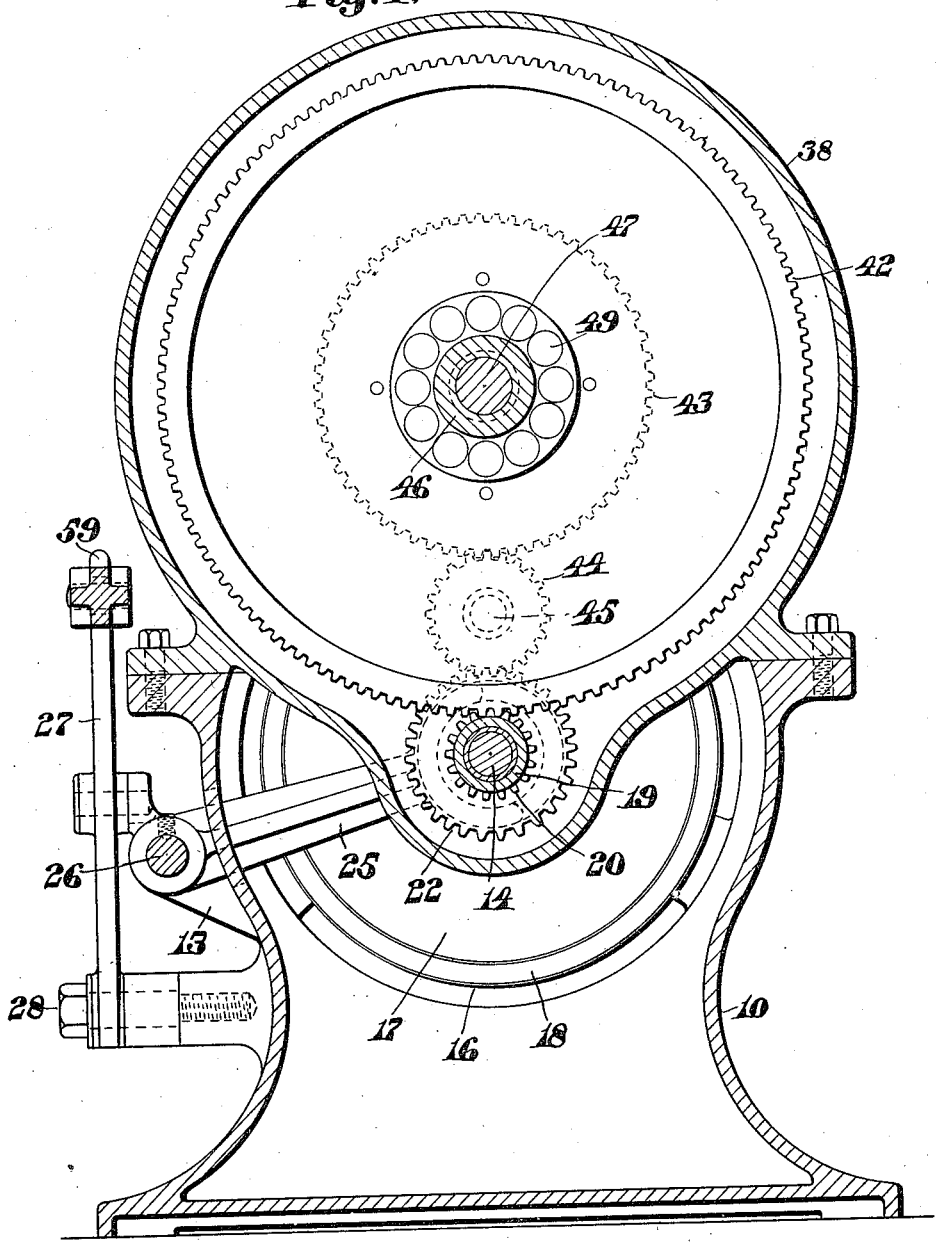
Figure 5:
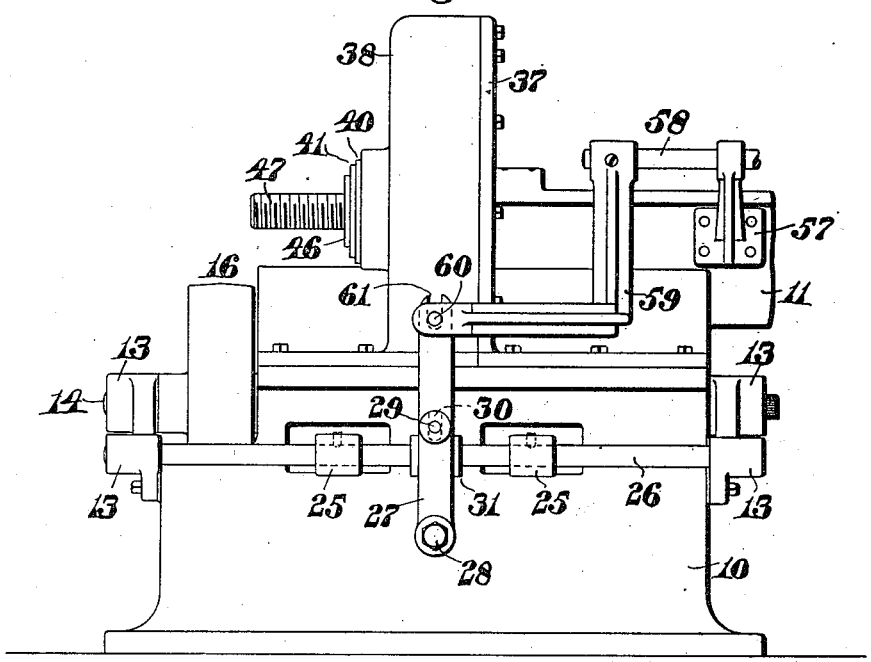
Figure 6:
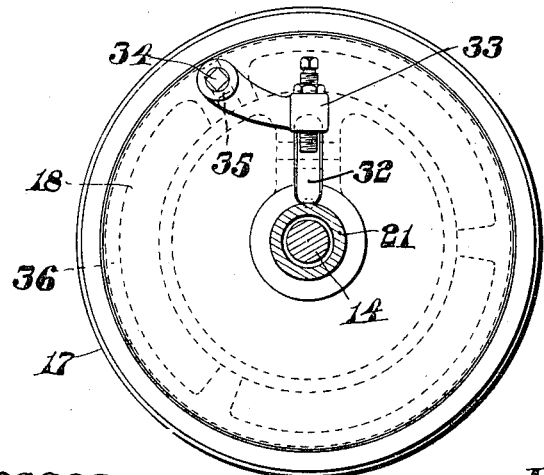

Of the drawings: Figure 1 represents a plan of a machine embodying the features of the present invention. Fig. 2 represents a vertical longitudinal section of the same, the cutting plane being on line 2—2 on Fig. 1. Fig. 3 represents an end elevation of the same, showing a cutting tool in section. Fig. 4 represents a transverse vertical section of the same, the cutting plane being on line 4—4 on Fig. 2. Fig. 5 represents a rear elevation of a portion of the machine, showing the mechanism for operating the clutches. Fig. 6 represents an end elevation of one of the clutch mechanisms, drawn to an enlarged scale, the cutting plane being on line 6—6 on Fig. 2. Fig. 7 represents a vertical section through the reciprocating carriage or slide head and the broach or tool holder supported therein. Fig. 8 represents a horizontal section of the same, the cutting plane being on line 8—8 on Fig. 7. Fig. 9 represents a transverse vertical section of the same, the cutting plane being on line 9—9 on Fig. 7. Fig. 10 represents a perspective view of the end of the bed frame and showing the perforated end plate thereof, and Fig. 11 represents a perspective view of the removable face plate the shank of which is normally positioned in the perforation in said end plate.

Similar characters designate like parts throughout the several figures of the drawings.

In the drawings, 10 represents a base provided with an extension 11, this extension or bed frame 11 being supported at its outer end by means of a standard 12 and being open at the top. The inner face of the side walls of this bed frame 11 is provided with the guide-ways 11$^x$ extending lengthwise thereof. Secured to the base 10 and at either end thereof, and the brackets 13, in which is revolubly mounted a shaft 14. Keyed to the shaft 14 and adjacent to the brackets 13 are clutches 15 and 16, each composed of an outer member 17 and an inner member 18. The inner member 18 of the clutch 15 is keyed to and revolves with a sleeve 19, mounted upon the shaft 14 and revoluble independently thereof. The opposite end of this sleeve 19 has keyed thereto so as to revolve therewith a pinion 20. The inner member 18 of the clutch 16 is in a similar manner keyed to a sleeve 21, mounted upon the shaft 14 and revoluble independently thereof, the opposite end of said sleeve having keyed thereto a gear 22. The sleeve 19 has slidably mounted thereon a cone-shaped clutch operating member 23, this member 23 being splined to said sleeve so as to revolve therewith while adapted to reciprocate longitudinally thereof. The sleeve 21 is provided with a similar operating member 24 adapted to operate the clutch 16 when desired. Each of these operating members 23 and 24 is provided with an annular groove with which a forked member 25 engages. Each of these forked members 25 is secured to a reciprocating rod 26 mounted in bearings in the brackets 13. Midway between the forked members 25 is a lever 27 pivoted at 28 to the base 10, this lever being provided with a projection 29 extending into a slot 30 formed in a member 31 secured to said reciprocating rod 26. It is obvious that whenever the lever 27 is moved about its pivot 28, the clutch operating members 23 and 24 will be moved longitudinally of the sleeves 19 and 21 to engage or disengage the clutches 15 and 16, as the case may be. The inner member 18 of each of the clutches 15 and 16 has pivoted thereto a member 32 adapted to be engaged by the conical ends of the operating members 23 or 24 when said members are moved toward the inner member 18. As the member 32 is moved about its pivot by this means, it will move outwardly the outer end of the member 33 pivoted at 34 to the inner member 18, and having a block 35 secured to or formed upon its inner end, said block being interposed between the ends of a split ring 36. It is obvious that when the block 35 is moved about the axis of the pivot 34 the split ring 36 will be expanded and caused to engage with the outer member 17 of the clutch. The outer member 17 of the clutch 16 is adapted to be driven by any suitable belt, thereby causing a continuous rotation of the shaft 14 in one direction, and when the split ring 36 is expanded in the clutch 16, it will cause the sleeve 21 to be rotated in the same direction. At the same time the outer member 17 of the clutch 15 is rotated in the same direction, being keyed to the shaft 14, but inasmuch as the split ring 36 of the clutch 15 is at this time out of contact with the outer member 17 of the clutch 15, no motion is transmitted thereby to the sleeve 19.

Secured to or forming a part of the base 10 is a vertical transverse plate 37, to which is secured, by suitable bolts, a casing member 38. In the plate 37 is mounted a cylindrical flanged bushing 39, and in alinement therewith in the casing member 38 is a similar bushing 40. Within the bushing 40 is mounted a hub 41 of a gear 42 meshing with the pinion 20 upon the sleeve 19. Secured to the gear 42 and mounted upon the hub 41 is a smaller gear 43 meshing with an intermediate gear 44 secured to and revoluble with a shaft 45 mounted in the bearing formed in the casing member 38, this intermediate gear in turn meshing with the gear 22 upon the sleeve 21. The hub 41 of the gear 42 is splined to and revolves with a nut 46 to which is threaded a non-revoluble screw 47. The nut 46 is provided with a radial flange 48 which prevents any movement thereof, and between this flange 48 and the flange of the bushing 39 are interposed anti-friction members 49 which take up the end thrust when the cutting blade 50 is in operation.

When it is desired to cut a key way in a gear, such as 51 shown in Fig. 2 of the drawings, the gear is placed upon the cylindrical support 52, the shank of which is mounted in a face plate 53ˣ removably secured to the vertical end plate 53 of the extension 11, this plate 53 having an opening therethrough adapted to give access to the guideways 11ˣ extending lengthwise of the bed frame 11. The lever 27 is then moved in such a direction as to cause the clutch operating member 23 to engage the pivoted member 32 and cause an engagement between the outer and inner members 18 of the clutch 15 by means of its split ring 36. This will permit the rotation of the outer member 17 of the clutch 16 to be transmitted through the clutch 15 to the sleeve 19, causing the rotation of the gear 42 through the medium of the pinion 20, and as this gear 42 is splined or otherwise secured to the nut 46, said nut will be rotated in a direction to cause a movement of the screw 47 in the direction of the arrow $a$ on Fig. 2 of the drawings. This movement of the screw will cause the working tool 50 to effect a cutting in the gear or other member 51 mounted upon the support 52. During this operation the smaller gear 43 being secured to the gear 42 will rotate in the same direction, and, through the medium of the intermediate gear 44, a movement in the opposite direction will be imparted to the gear 22 and the sleeve 21 on which it is mounted, this being possible owing to the fact that the inner member 18 and the outer member 17 of the clutch 16 are disengaged at this time. When the lever 27 is moved in the opposite direction so that the clutch-operating member 24 causes the inner and outer members 18 and 17 of the clutch 16 to rotate in unison the sleeve 21 will be rotated in the opposite direction to that just described, and through the medium of the gears 22, 44, and 43, the nut 46 will be rotated in the opposite direction, thereby moving the screw 47 in the direction opposite to the arrow $a$ on Fig. 2, this return movement of the screw being quicker than its movement in the opposite direction when performing a cutting operation. While this is occurring, the gear 42, through the medium of the pinion 20, is rotating the sleeve 19 and the inner member 18 of the clutch 15 in a direction opposite to the rotation of its outer member, this being possible owing to the disengagement of the split ring 36 of said clutch member. The screw 47 has secured to its opposite end a carriage 54 slidable on the guides 11ˣ extending lengthwise of the bed or extension 11 substantially as shown and described in the Patent No. 876.277 issued to J. N. Lapointe, Jan. 7, 1908. This carriage is provided with a T groove in which is mounted a tool holder 55 having flanges to fit the T-groove. The tool holder 55 may be adjusted vertically lengthwise of the T-groove in the carriage 54 into any desired position by means of the adjusting screw 56, thereby moving the tool transversely of the screw 47. It is obvious that the supporting member 52 and the opening therein for the cutter 50 always remain the same, and that it is necessary for each machine to have a plurality of these supports of different sizes.

To the rear of the extension 11 are a plutality of brackets 57 in which is adapted to reciprocate a rod 58, the reciprocation of which is parallel to the axis of the screw 47. Secured to one end of the rod 58 is a connector 59 provided with a projecting member 60 engaging a slot 61 in the upper end of the lever 27. It is obvious that when the rod 58 is reciprocated in either direction this movement will be transmitted through the projection 60 to the lever 27, and thereby cause the clutch operating members 23 and 24 to be moved from a neutral position in either direction to cause an engagement of one or the other of the clutch mechanisms 15 and 16. The rod 58 has secured thereto a collar 62 to which is pivoted an arm 63 secured to the oscillating rod 64 mounted in bearings in the extension 11 and having a handle 65 secured to its front end, said handle being provided with a suitable locking device 65$^x$ to engage the plate 66 to hold the rod 58 in its normal position as shown in Fig. 2, with the clutch operating members 23—24 disengaged from both clutches 15 and 16. The rod 58 is provided at the end nearest the end plate 53 with a stop 67 in the path of the projecting pin 68 carried by the carriage 54 so that when the carriage reaches a point near its extreme outward position it will engage said stop 67 and move the rod 58 to the left of Fig. 2, thereby operating the lever 27 to move the slidable clutch operating members 23 and 24 into a position intermediate the clutches 15 and 16, as indicated in Fig. 2 of the drawings.

In order to operate the machine, the parts being in the position indicated in Figs. 1 and 2, the operator moves the handle 65 to the left, thereby causing the clutch 15 to be actuated so that motion will be imparted through the pinion 20 and gear 42 to rotate the nut 46 so as to move the tool holder in the direction of the arrow $a$ on Fig. 2 of the drawings. This driving mechanism is so geared down that the screw will move very slowly to permit a more effective cutting. The driving mechanism will continue until the stop pin 68 on the carriage 54 comes into contact with the adjustable stop 69 on the rod 58, when the rod 58 will be moved toward the driving mechanism and cause the slidable rod 26 to be moved in its bearings, thereby returning the clutch operating members 23 and 24 to their normal position as indicated in Fig. 2. To reverse the movement of the screw 47 and return the tool holder to its normal position, preparatory to another cutting, the handle 65 is moved to the right, thereby moving the clutch operating member 24 into a position to actuate the clutch 16, permitting motion to be transmitted through the sleeve 21, pinion 22, intermediate gear 44, and gear 43, to the nut 46, causing its rotation in the opposite direction, and thereby moving the tool holder in a direction opposite to that indicated by the arrow $a$ on Fig. 2 of the drawings. The tool holder will move in this reverse direction until the pin 68 comes into contact with the stop 67, thereby causing a sufficient movement of the rod 58 and the lever 27 to disengage the member 24 from the clutches 16, returning the parts to the normal position, as indicated in Fig. 2 of the drawings. The operation of the machine will then be discontinued until the operator causes another operation by movement of the handle 65.

It is obvious, from an inspection of the drawings, that the pinions and gears for driving the nut 46 are all inclosed in a casing 37—38, making it possible to fill this casing with oil or other lubricant. It is self-evident that this is of considerable advantage in a machine of this class, in which it is desirable to have the operating parts run smoothly and quietly. The only belt necessary for driving the machine is that used upon the pulley surface of the clutch member 16, this belt (not shown) being driven from any suitable countershaft. The driving mechanism for actuating the tool holder is compact and simple and permits the reciprocation of the tool holder to be stopped in either direction without jar or injury, while it provides a rapid movement of the tool holder when not in operation and a slow movement when the tool is performing the cutting. By this construction a machine for cutting key seats and slots in articles of various sizes and of different bores is produced which is simple in construction and very effective in operation.

It is believed that the operation and many advantages of the invention will be thoroughly understood from the foregoing.

Having thus described my invention, I claim:

1. In a machine of the class described, the combination of a bed frame; a tool holder adapted to reciprocate lengthwise thereof and consisting in part of a nonrevoluble screw; a nut on said screw; gears mounted upon the periphery of said nut and secured thereto; a revoluble shaft parallel to said screw; and mechanism on said shaft adapted to coact with said gears to impart rotary movement to said nut in either direction and to be moved into inoperative position by the reciprocation of said holder.

2. In a machine of the class described, the combination of a bed frame; a tool holder adapted to reciprocate lengthwise thereof and consisting in part of a nonrevoluble screw; a nut on said screw; two gears secured to the periphery of said nut; a revoluble shaft parallel to said screw; and mechanism thereon for driving said gears alternately in opposite direction adapted to be moved into inoperative position by the reciprocation of said holder.

3. In a machine of the class described, the combination of a bed frame; a tool holder adapted to reciprocate lengthwise thereof and consisting in part of a nonrevoluble screw; a nut on said screw; two gears secured to the periphery of said nut; a revoluble shaft parallel to said screw; mechanism thereon for driving said gears alternately in opposite directions, and mechanism operable by the reciprocating movement of said holder for stopping the operation of said driving mechanism.

4. In a machine of the class described, the combination of a bed frame; a reciprocating tool holder thereon consisting in part of a nonrevoluble screw; a nut on said screw; two gears secured to the periphery of said nut; a revoluble shaft parallel to said screw; two sleeves upon said shaft; a pinion on each adapted to drive one of the nut gears; clutches fixedly secured to said shaft for controlling the operation of said sleeves; manually controlled mechanism slidable lengthwise of said sleeves for actuating either of said clutches; and means controlled by the movement of said holder for disengaging said engaged clutch.

5. In a machine of the class described, the combination of a bed frame; a reciprocating tool holder thereon consisting in part of a nonrevoluble screw; a nut on said screw; two gears secured to said nut; a revoluble shaft parallel to said screw; two sleeves upon said shaft; a pinion on each adapted to drive one of the nut gears; an intermediate gear interposed between one of said nut gears and one of said pinions; clutches fixedly secured to said shaft for controlling the operation of said sleeves; manually controlled mechanism slidable lengthwise of said sleeves for actuating either of said clutches; and means controlled by the movement of said holder for disengaging said clutch.

6. In a machine of the class described, the combination of a bed frame; a reciprocating tool holder thereon consisting in part of a nonrevoluble screw; a revoluble nut on said screw; gears on said nut; a shaft parallel to said screw; clutch mechanisms thereon adapted to be operated to alternately transmit rotary movement to said nut gears in opposite directions; and means operable by the movement of said holder for disengaging the engaged clutch at the end of the movement of said holder in either direction.

7. In a machine of the class described, the combination of a bed frame; a reciprocating tool holder thereon consisting in part of a nonrevoluble screw; a revoluble nut on said screw; gears on said nut; a shaft parallel to said screw; two sleeves mounted upon said shaft and revoluble independently thereof; a pinion on each adapted to transmit rotary movement to one of said nut gears; clutch mechanisms each having one member secured to said shaft and another member secured to one of said sleeves; a clutch operating member keyed to each sleeve and adapted to be reciprocated thereon; manually controlled mechanism for moving said clutch operating member into operative position; and means operable by the movement of said holder for returning said member to its inoperative position.

8. In a machine of the class described, the combination of a bed frame; a reciprocating tool holder thereon consisting in part of a nonrevoluble screw; a revoluble nut on said screw; gears on said nut; a shaft parallel to said screw; two sleeves mounted upon said shaft and revoluble independently thereof; a pinion on each adapted to transmit rotary movement to one of said nut gears; clutch mechanisms each having one member secured to said shaft and another member secured to one of said sleeves; a clutch operating member keyed to each sleeve and adapted to be reciprocated thereon; means for moving said operating member into operative position; and mechanism operable by the reciprocation of said tool holder for imparting endwise movement to said clutch operating members and locking them in disengaged position.

9. In a machine of the class described, the combination of a bed frame; a reciprocating tool holder thereon consisting in part of a nonrevoluble screw; a revoluble nut on said screw; gears thereon; a shaft parallel to said screw; two sleeves mounted upon said shaft and revoluble independently thereof; a pinion on each adapted to transmit rotary movement to one of said nut gears; clutch mechanisms each having one member secured to said shaft and another member secured to one of said sleeves; a clutch operating member keyed to each sleeve and adapted to be moved thereon into operative position; a reciprocating rod adapted to be moved endwise by the movement of the tool holder; and forked members secured thereto and adapted to move said clutch operating members into disengaged position at the end of a predetermined movement of said tool holder.

10. In a machine of the class described, the combination of a bed frame; a reciprocating tool holder thereon consisting in part of a nonrevoluble screw; a nut in which said screw is mounted having a radial flange adapted to withstand the cutting thrusts; a casing provided with bearings for said nut; and means inclosed within said casing for rotating said nut alternately in opposite directions.

11. In a machine of the class described, the combination of a bed frame; a reciprocating tool holder thereon consisting in part of a nonrevoluble screw; a nut in which said screw is mounted; gears thereon; a shaft parallel to said screw; driving mechanisms thereon including pinions adapted to impart rotary movement to said gears; and a casing inclosing said gears and pinions and provided with bearings for said nut and for said parallel shaft.

12. In a machine of the class described, the combination of a bed frame; a tool holder reciprocable thereon including a nonrevoluble screw; a nut on said screw; a shaft parallel to said screw; driving mechanisms thereon for imparting rotary movement to said nut alternately in opposite directions; and means for disengaging said driving mechanisms at the end of a predetermined movement of said tool holder.

13. In a machine of the class described, the combination of a bed frame; a tool holder reciprocable thereon including a nonrevoluble screw; a nut on said screw; a shaft parallel to said screw; driving mechanisms on said shaft for imparting rotary movement to said nut; clutch mechanisms on said shaft for controlling the direction of movement of said driving mechanisms; a plurality of clutch operating members slidable lengthwise of said shaft; means for moving said clutch operating members to actuate either of said driving mechanisms; and means controlled by the movement of said tool holder for moving said operating members into disengaged position.

14. In a machine of the class described, the combination of a tool holder including in part a nonrevoluble screw; a revoluble nut on said screw having secured thereto two members adapted to be driven; a shaft parallel to said screw; two sleeves thereon each provided with a driving member adapted to drive one of said nut members; means for imparting rotary movement to said nut from either driving member; and means for stopping said rotary movement at the end of a predetermined movement of said tool holder.

15. In a machine of the class described, the combination of a tool holder including in part a nonrevoluble screw; a revoluble nut on said screw having secured thereto two members adapted to be driven; a shaft parallel to said screw; two sleeves thereon each provided with a driving member adapted to drive one of said nut members; means for imparting rotary movement to said nut from either driving member at different speeds; and means controlled by the movement of said tool holder for stopping said rotary movement.

16. In a machine of the class described, the combination of a tool holder including in part a nonrevoluble screw; a revoluble nut on said screw; two gears of different diameters secured to and revoluble with said nut; a shaft parallel to said screw; means upon said shaft for imparting rotary motion to either of said gears; and means for stopping said rotary motion at the end of a predetermined movement of said holder in either direction.

17. In a machine of the class described, the combination of a tool holder including in part a nonrevoluble screw; a revoluble nut on said screw; two gears of different diameters secured to and revoluble with said nut; a shaft parallel to said screw; two sleeves on said shaft; a pinion on each sleeve for transmitting motion to one of said gears; means for revolving either of said sleeves; and means for stopping the revolution of said sleeves at the end of a predetermined movement of said holder in either direction.

18. In a machine of the class described, the combination of a tool holder including in part a nonrevoluble screw; a revoluble nut on said screw; two gears of different diameters secured to and revoluble with said nut; a shaft parallel to said screw; a driving pulley mounted upon and secured to said shaft; two sleeves on said shaft; a pinion on each sleeve one of which meshes with one of said nut gears; an intermediate gear meshing with the other nut gear and the pinion on the other sleeve; means for imparting rotary motion from said driving pulley to either sleeve; and means controlled by the reciprocation of said tool holder for stopping the rotary motion of said rotating sleeve.

19. In a machine of the class described, the combination of a working tool; a reciprocating tool holder consisting in part of a nonrevoluble screw; a nut thereon; gears on said nut; a revoluble shaft parallel to said screw; mechanism on said shaft coacting with said gears to impart rotary movement to said nut in either direction; a reciprocating device coacting with the mechanism on said parallel shaft for controlling the direction of movement of said mechanism; a lever for controlling the reciprocation of said device; and means operable by the movement of the tool holder for actuating said lever at predetermined times to move said reciprocating device into inoperative position.

20. In a machine of the class described, the combination of a working tool; a reciprocating tool holder consisting in part of a nonrevoluble screw; a nut thereon; two gears secured to said nut; a revoluble shaft parallel to said screw; mechanism thereon for driving said gears alternately in opposite directions; a reciprocating rod; members secured thereto and coacting with the gear driving mechanism for controlling the direction of movement of said mechanism; a lever for controlling the reciprocation of said rod; and means operable by the movement of the tool holder for actuating said lever at predetermined times to move said mechanism controlling members into inoperative position.

21. In a machine of the class described, the combination of a working tool; a reciprocating tool holder consisting in part of a nonrevoluble screw; a nut thereon; two gears secured to said nut; a revoluble shaft parallel to said screw; two sleeves upon said shaft; a pinion on each adapted to drive one of the nut gears; clutches on said shaft for controlling the operation of said sleeves; a reciprocating rod provided with arms for actuating said clutches; a lever for reciprocating said rod; and means operable by the movement of said tool holder for actuating said lever at predetermined times to disengage said clutches.

22. In a machine of the class described, the combination of a working tool; a reciprocating tool holder consisting in part of a nonrevoluble screw; a nut thereon; two gears secured to said nut; a revoluble shaft parallel to said screw; two sleeves upon said shaft; a pinion on each adapted to drive one of the nut gears; an intermediate gear interposed between one of said nut gears and one of said pinions; clutches on said shaft for controlling the operation of said sleeves; a reciprocating rod provided with arms actuating said clutches; a lever for reciprocating said rod; and means operable by the movement of said tool holder for actuating said lever at predetermined times to disengage said clutches.

23. In a machine of the class described, the combination of a working tool; a reciprocating tool holder consisting in part of a nonrevoluble screw; a revoluble nut thereon; gears on said nut; a shaft parallel to said screw; clutch mechanisms thereon adapted to be alternately operated to transmit rotary movement to either of said nut gears in opposite directions; and means controlled by the movement of said tool holder for disengaging said clutch mechanisms at the end of its reciprocation in either direction.

24. In a machine of the class described, the combination of a working tool; a reciprocating tool holder consisting in part of a nonrevoluble screw; a nut on said screw; a gear keyed to said nut and revoluble therewith; a gear of smaller diameter secured to said keyed gear; a revoluble shaft parallel to said screw; mechanism on said shaft coacting with said gear to impart rotary movement to said nut in either direction, the speed in one direction being different from that in the opposite direction; manually controlled means for starting said driving mechanism; and means controlled by the reciprocation of said holder for stopping said mechanism.

25. In a machine of the class described, the combination of a working tool; a reciprocating tool holder consisting in part of a nonrevoluble screw; a nut on said screw; a gear keyed to said nut and revoluble therewith; a gear of smaller diameter secured to said keyed gear; a revoluble shaft parallel to said screw; two sleeves freely revoluble upon said shaft; a pinion on one sleeve meshing with said keyed gear; a pinion on the other sleeve; an intermediate gear meshing with the latter pinion and the smaller nut gear; clutches on said shaft for controlling the operation of said sleeves; manually controlled means for engaging either of said clutches; and automatic means controlled by the movement of said tool holder for disengaging said engaged clutch at the end of the reciprocation of said tool holder in either direction.

26. In a machine of the class described, the combination of a framework; a tool holder reciprocable lengthwise thereof and adapted to receive a broach; a screw fixed to said tool holder; and a nut with driving connections having bearing in the frame engaged with said screw, said nut having a lateral flange adapted to withstand the cutting thrusts.

Signed by me at 4 Post Office Sq., Boston, Mass., this 22nd day of July, 1911.

FRANCIS J. LAPOINTE.

Witnesses:
 WALTER E. LOMBARD,
 NATHAN C. LOMBARD.